No. 795,490. PATENTED JULY 25, 1905.
E. H. CUDDY.
VEHICLE ATTACHMENT.
APPLICATION FILED DEC. 12, 1904.
2 SHEETS—SHEET 1.
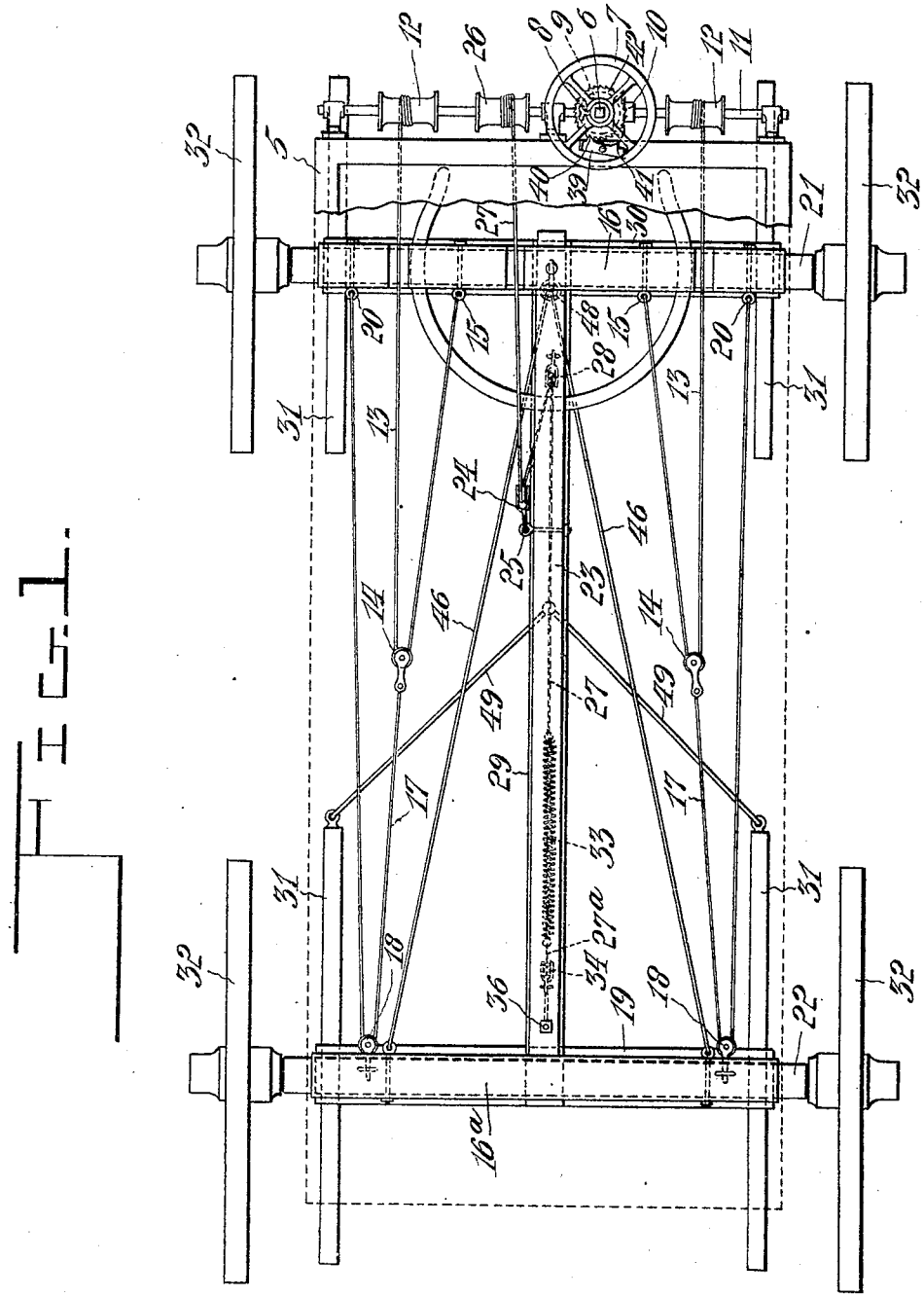
Witnesses: E. H. Cuddy, Inventor,
By Marion & Marion
Attorneys

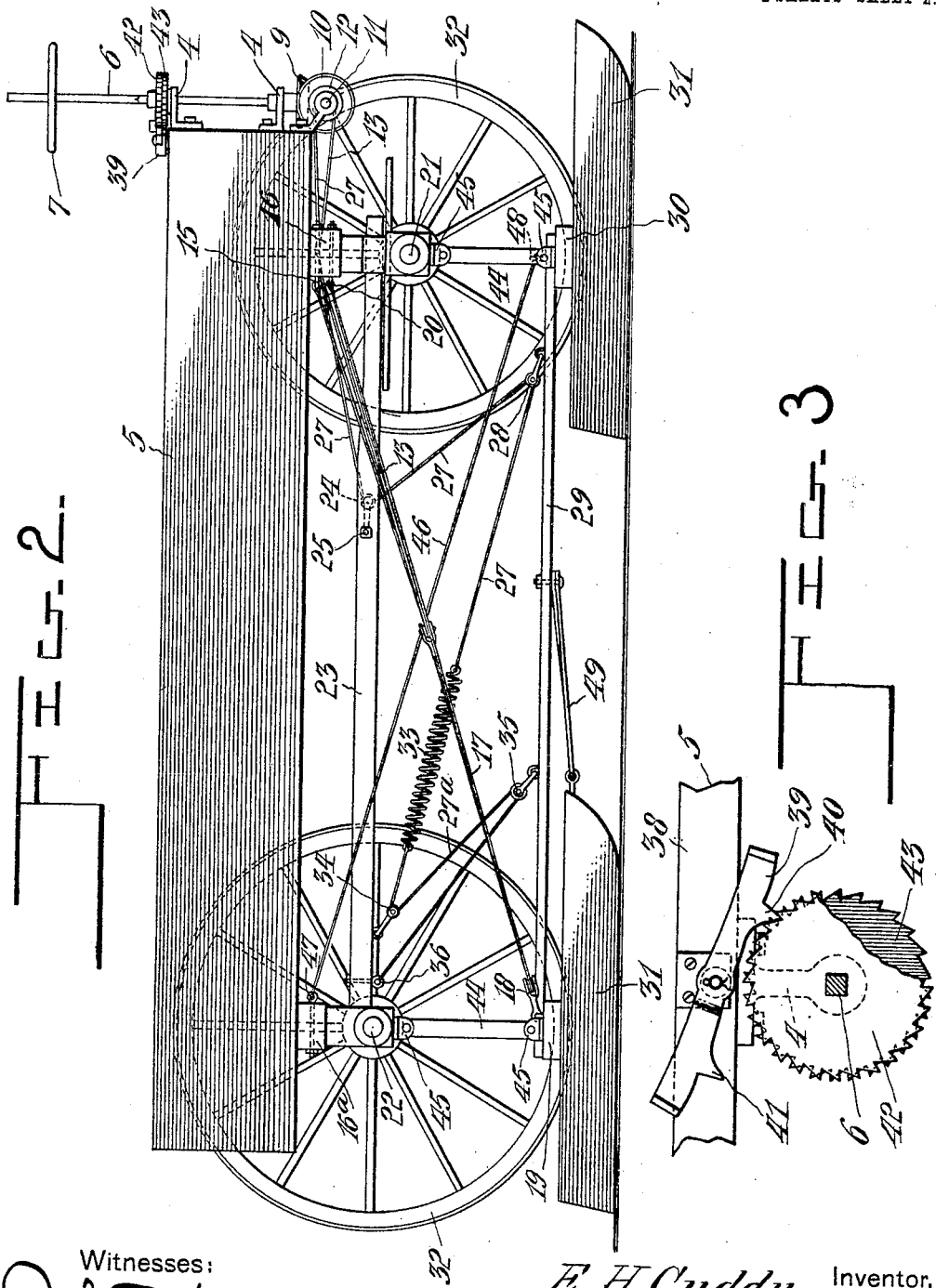

UNITED STATES PATENT OFFICE.

EDWARD HENRY CUDDY, OF FORT WILLIAM, CANADA.

VEHICLE ATTACHMENT.

No. 795,490.          Specification of Letters Patent.          Patented July 25, 1905.

Application filed December 12, 1904. Serial No. 236,469.

*To all whom it may concern:*

Be it known that I, EDWARD HENRY CUDDY, a subject of the King of Great Britain, residing at Fort William, county of Thunder Bay, in the Province of Ontario, Canada, have invented certain new and useful Improvements in Vehicle Attachments; and I do hereby declare that the following is a full, clear, and exact description of the invention, such as will enable others skilled in the art to which it appertains to make and use the same.

This invention relates to new and useful improvements in attachments adapted to be connected with wheeled vehicles whereby said wheeled vehicles may be used upon snow and ice; and it consists in certain features of novelty in the detail construction and arrangement thereof, all as hereinafter more fully described, and specifically pointed out in the claims.

The object of the invention is to provide attachments which may be placed upon any ordinary wheeled vehicle of the class shown in the drawings and carried thereby in position ready for use in the event of snow-covered roads being encountered, said attachment comprising simple devices of minimum weight combined with maximum strength and great durability.

Referring to the annexed drawings, in which similar numerals of reference indicate corresponding parts in all the views, Figure 1 is a plan of the underframing of a wheeled vehicle equipped with the invention. Fig. 2 is a side elevational view thereof, showing the vehicle elevated and supported by the runners illustrated in said figure with the nearer wheels removed; and Fig. 3 represents a detail of construction hereinafter referred to.

Carried by brackets 4, which are connected with the forward end of the vehicle-body 5, is a vertically-extending staff 6, rotatable in said brackets, upon the upper end of which is carried a hand-wheel 7, which may be adjustable vertically upon said staff and is provided with any suitable means for securing it in position—as, for example, the set-screws 8 passing through the hub of said wheel 7 and bearing against said staff. Secured on the staff 6 is a bevel-gear 9, which meshes with a correspondingly-beveled gear 10 on the shaft 11, which latter extends transversely of the vehicle at the front end thereof. On the shaft 11 are drums 12 12, one at each end of said shaft, and wound upon said drum in the same direction are cords or cables 13, which pass thence through the pulley-blocks 14 and are connected, by means of the clips 15, with the vehicle-bolster 16. Connected with the pulley-blocks 14 are cords or cables 17, which pass thence through the pulley-blocks 18, which are supported on the sleigh-bunk 19 and extend forwardly to the eyes or clips 20, which are secured to said bolster 16. Extending from the front axle 21 to the rear axle 22 of the wheeled vehicle is a wagon reach-pole 23, upon which is supported the pulley-block 24, as by means of the loop or eye 25, which passes through said reach-pole. Wound upon the drum 26 upon said shaft 11 is a cord or cable 27, which is wound in a direction opposite to that of the cables 13 and extends through the pulley-block 24 and downwardly, as best shown in Fig. 1, where said cable 27 passes through the pulley-block 28, which is supported by the sleigh reach-pole 29, said latter reach-pole extending from the rear bunk 19 to the forward bunk 30, said bunks serving as bolsters connecting the sleigh-runners 31, which are provided at opposite sides of the vehicle and are carried, preferably, between the wheels 32 of the vehicle. It will be noted that the pulley-block 28 is located in near proximity to and slightly to the rear of the vehicle-axle 21, and from the block 28 said cable 27 is carried rearwardly and upwardly, where it is connected with one end of the coil-spring 33, while from the opposite end of said coil-spring 33 an extension $27^a$ of said cable 27 passes through the pulley-block 34, which is supported by the said reach-pole 23, and after passing through said pulley-block 34 said cable $27^a$ passes downwardly and through the pulley-block 35, which is connected to the reach-pole 29 just forwardly of the rear sleigh-runners 31, after which the cable $27^a$ rises obliquely upwardly and terminates in the eyelet 36, which is secured to the reach-pole 23 just forwardly of the rear axle 22.

Supported by the upper bracket 4 before referred to or by any convenient means in proximity thereto is a transversely-extending bar 38, upon which is pivotally mounted the rockable pawl-arm 39, upon which are formed the pawls 40 and 41, the pawl 40 being adapted to coöperate with the ratchet-wheel 42 and the pawl 41 being adapted to coöperate with the ratchet-wheel 43, which ratchet-wheels 42 and 43 may be integral and are carried upon a non-circular portion of the shaft 6, as shown in Fig. 3, whereby the ratchet-wheels 42 and 43 are necessarily rotated with the said staff, so that the staff may be locked by means of the pawls 40 and 41 in any desired position, so as to hold the runners 31 at any desired position.

Extending downwardly from the axles 21 and 22 are links 44, which are pivotally connected, by means of clips 45, with said axles and with the bunks or bolsters of the sleighs.

The operation of the device is as follows: Depending on the manner in which the cables referred to are wound upon the drums 12 and 26, rotation of the wheel 7 will cause corresponding rotation of the bevel-gear 9, thus rotating the shaft 11 and said drums, so that when rotated in one direction the cables 13 will be wound upon the drums 12 and the cable 27 will be unwound from its drum 26, thereby lowering the runners 31 to the ground and preserving the proper position thereof by means of the reach-pole 29 and links 44 before referred to; but when it is desired to raise the runners 31, so as to use the vehicle as a wagon, the staff 6 is rotated in the opposite direction, whereupon the cable 27 is wound upon its drum 26 and the runners 31 by means of said cable and the pulley-blocks 24, 28, 34, and 35 referred to are drawn rearwardly and upwardly from the ground.

Extending from the rear bolster 16ª to the forward end of the reach-pole 29 is a connecting chain or cable 46, which is connected with the clip or eyelet 47 at one end and with the pin 48 at its opposite end, and it will be evident that said brace will materially reinforce the structure when in use and prevent excessive forward thrust of the links 44 and runners 31.

Connecting the rear runners 31 with the reach-pole 29 are rods 49, which assist in holding said rear runners in alinement, and it will be evident that the forward runners may be connected in any convenient manner with the other parts of the vehicle to preserve the proper alinement thereof.

It is preferred that the rigging for the structure thus provided may consist of chain or wire rope, or both, as may be found most suitable, while the frame for connecting the sleigh-bunks to wagon-axles or the axles of the wagon may be constructed of metal or wood and properly braced with sufficient allowance in the castings and pivotal points to permit of sufficient lateral movement being available for the free curving of the front axle when the runners are drawn up and the wheels are in use.

It will be evident that the runners and their attachments may be connected with any ordinary vehicle which is provided with a reach extending from front to rear bolster, in which case the connections referred to as secured to the reach 23 should be connected with said reach; but if for any reason a reach is not provided these connections may be made with the wagon-body or with brackets or other members (not shown) extending below said body.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structure set forth.

Having described my invention, what I claim, and desire to secure by Letters Patent, is—

1. In combination with a wheeled vehicle, a plurality of runners pivotally connected with the vehicle, a horizontal shaft rotatably secured on the forward end of the vehicle, drums mounted on the shaft, a plurality of oppositely-wound cables secured on the drums and connected to the runners, and means for rotating the shaft, whereby the runners may be raised and lowered.

2. In combination with a wheeled vehicle, a plurality of runners pivotally connected with the vehicle, cables connected with the runners, a resilient member disposed on one of said cables intermediate of its length, and drums on which said cables may be wound, whereby the runners are raised and lowered.

3. In combination with a wheeled vehicle, a plurality of runners pivotally connected with the vehicle, a horizontal shaft rotatably secured on the forward end of the vehicle, drums mounted on the shaft, a plurality of oppositely-wound cables wound on the drums and secured to the runners, a bevel-gear secured on said shaft, a vertical staff rotatably mounted on the vehicle, and a bevel-gear thereon in mesh with the bevel-gear on the shaft, whereby the shaft may be rotated.

4. In combination with a wheeled vehicle, a plurality of runners pivotally connected with the vehicle, a horizontal shaft rotatably secured on one end of the vehicle, drums mounted on the shaft, a plurality of oppositely-wound cables wound on the drums and secured to the runners, a bevel-gear secured on the shaft, a vertical staff rotatably mounted on the vehicle, a bevel-gear thereon in mesh with the bevel-gear on the shaft, whereby said shaft may be rotated, a ratchet-wheel on the staff and a pawl adapted to engage the ratchet-wheel.

5. In combination with a wheeled vehicle, a plurality of runners pivotally secured to the vehicle, a horizontal shaft rotatably secured on the forward end of the vehicle, drums secured on the shaft, a plurality of cables wound oppositely on the drums and secured to the runners, a bevel-gear secured on the shaft, a vertical staff rotatably secured on the vehicle, a bevel-gear on the staff in engagement with a bevel-gear on the shaft, a ratchet-wheel having two sets of teeth mounted on the staff, and an arm pivoted to the vehicle and provided with oppositely-disposed ends adapted to engage said teeth alternately.

In witness whereof I have hereunto set my hand in the presence of two witnesses.

EDWARD HENRY CUDDY.

Witnesses:
    J. H. NEELAND,
    M. C. LILLIE.